April 18, 1939.  L. N. HARTOG  2,155,374

PROCESS AND APPARATUS FOR MANUFACTURING MALTO-DEXTRINE

Original Filed July 9, 1935

INVENTOR.
Louis N. Hartog
BY
ATTORNEY.

Patented Apr. 18, 1939

2,155,374

UNITED STATES PATENT OFFICE 2,155,374

PROCESS AND APPARATUS FOR MANUFACTURING MALTO-DEXTRINE

Louis N. Hartog, New York, N. Y.

Continuation of application Serial No. 30,475, July 9, 1935. This application June 2, 1938, Serial No. 211,340

8 Claims. (Cl. 127—34)

The present application is a continuation of my co-pending application, Serial No. 30,475, filed July 9, 1935.

The invention relates to the production of malto-dextrine from corn syrup, or from the syrups of other grains, such for instance, as rice, barley, rye and wheat.

Malto-dextrine, variously manufactured, has long been used in many arts. Its use in certain arts has, however, often been curtailed by the costliness or inconvenience of the processes and apparatus by which it has heretofore been made; and by an amount of moisture in the article itself which has rendered it sticky, lumpy, inconvenient to handle, and unsuitable for certain uses unless subjected to a drying process.

An object of the invention is a process and apparatus wherein there may be produced from syrups, such as mentioned, a malto-dextrine which may contain as little as two percent, or less, of moisture, and which may be packed, shipped and stored as a stable, free-flowing, dry, powdered or granulated, substance.

An object of the invention is the production of a dry, powdered or granulated malto-dextrine at relatively low cost, and in a minimum of time, by a process which is simple, and which assures uniformity and certainty as to grade and character of out-put; and by apparatus which is simple and easily operable by relatively unskilled labor, requires but little space, and is clean in its operation.

I am aware that certain features of the apparatus are, of themselves, old in other uses and connections; and, as to the apparatus, therefore, the invention resides in the selection, arrangement and combination of these old elements, and other elements, whereby to produce and treat intermediate products according to the steps of one continuous process, leading to the ultimate product.

For purposes of illustration, the invention is here more particularly described in its application to the production, from corn and brewer's syrups, of pulverized or granulated malto-dextrine for use as a malt adjunct in the brewing of beer, ale, stout, porter, etc.

In the manufacture of malto-dextrine from such syrups there is a condensation of certain simple sugars into what are termed double sugars. The completed article is composed principally of carbohydrates which exist therein in three forms, to wit, dextrose, maltose and dextrines. Of these, the only one which is directly fermentable is dextrose. It follows, therefore, that, as a whole, the malto-dextrine may, according to its dextrose content, be less fermentable than the syrup from which it was derived. This is a point of interest to brewers of ales and beers; and is used to great advantage in the baking industry.

As is well known, corn syrup is produced from starch by a process termed "hydrolysis". If this hydrolysis is carried through to completion, a final product is dextrose. If the action is interrupted, the syrup is obtained. The syrup always contains a large amount of water, commonly from 17% to 22%, dependant upon the stage to which the hydrolysis is carried. It also contains other substances which would be deleterious in their effects upon a beer or other malt liquor.

Corn syrup and all other intended malt adjuncts in syrup form, other than malto-dextrine, must therefore, after being shipped to a brewery for use as a malt adjunct, be subjected at the brewery to an expensive and troublesome cooking treatment to eliminate the water and other undesirable substances therein. Needless to say, the shipment over long distances of a material such as corn syrup, having 20% or other large percentage of undesired water, and of containers for the same, adds a high freight charge to the cost of the malt liquor. Malto-dextrine, on the other hand, may be made from the corn or brewer's syrup at the place where the latter is made, and if made according to the present invention in the form of a light, dry, powdered, or granulated or crystalized, substance, the freight charges thereon will be reduced twenty percent.

It is here that the value of the present invention best expresses itself; for, if the malto-dextrine is a sticky, lumpy, or not readily workable form, or if its cost of manufacture, as by the old processes, counterbalances the cost of shipment and treatment at the brewery of the other materials usuable as malt adjuncts, then those other materials will continue to be used by brewers; and this despite the fact that the extract values of the several substances for brewing purposes shows as follows:

| | Per cent |
|---|---|
| Malto-dextrine | 98 |
| Corn grits and flake wheat | 75 |
| Malt of average quality | 64 |
| Grape sugar and glucose | 80 |
| Cerealine or corn flakes | 78 |
| Corn meal | 76 |
| Refined grits | 90 |
| Rice | 79 |

The malto-dextrine, made according to the present invention, 98% pure extract, is ready to be poured into the brew in dry powdered or crystaline form. The 2% water is not objectionable to the brew. As low as 4% or 5%, however, would have caused gumming and lumping, and have created unworkable conditions by preventing pouring and proper distribution of the substance in the brew; except at the cost of additional treatment and labor. Hence it is that vital steps of the process hereinafter described are concerned with securing a malto-dextrine which is dry to the order of 98%, and of maintaining it at this degree of dryness throughout the process of grinding and powdering.

The term "malto-dextrine" is well understood in the arts. It is to be found, over the years, in any quantity of literature relating to brewing, baking, candy making, fibre-filling, etc. It is also well understood that while the constituents of malto-dextrine may be the same, the relative percentages of these constituents may vary widely, according to the intended use of the malto-dextrine. For instance, in the brewing art, the relative percentages of the constituents of the malto-dextrine will be different for a "high fermentable", intended for use in the manufacture of ale from a "low fermentable" intended for use for the manufacture of beer of low alcholic content. Below are actual chemical analyses made of "high fermentable" and "low fermentable" malto-dextrines produced by the process of the present invention for brewing purposes.

| High fermentable | | Low fermentable | |
| --- | --- | --- | --- |
| | Percent | | Percent |
| Moisture | 0.80 | Moisture | 1.40 |
| Total extract | 99.20 | Total extract | 98.60 |
| Sugar (as maltose) | .90 | Total sugars | 52.96 |
| Sugar (as dextrose) | 81.19 | Ash or mineral matter | .24 |
| Ash or mineral matter | .40 | Protein (N×6.25) | .43 |
| Protein (N×6.25) | .39 | Dextrines | 44.79 |
| Dextrines | 16.32 | Invert or cane sugar | None |
| Unconverted starch | None | Total acidity )as lactic acid). | .18 |
| Total acidity (as lactic acid). | .19 | | |

The relative percentages of the constituents of the malto-dextrine will be determined by the particular syrup used, by the length of time of boiling, and by the degree of temperature and vacuum maintained in the boiler. All of these determinations, however, are well within the province of one skilled in the art.

Below are the analyses of brewer's syrups from which the above high and low fermentable malto-dextrines were obtained by the present invention.

| | Low fermentable | High fermentable |
| --- | --- | --- |
| Degrees Baumé | 42.84 | 43.00 |
| Water | 19.23 | 18.5 |
| Extract | 80.77 | 83.66 |
| Ash | .45 | .46 |
| Acidity as lactic acid | .23 | .23 |
| Protein | .33 | .08 |
| Reducing sugars as dextrose | 26.26 | 47.7 |
| Fermentable extract (by fermentation) | 29.80 | 56.5 |
| Non-fermentable extract | 50.97 | 35.96 |
| Color (Lovibond) | Light | Light |

Corn syrup will ordinarily show an analysis intermediate those of the above two brewer's syrups.

A feature of the invention is a step, and means, whereby preliminary to the removal of the malto-dextrine from the boiler in dry viscous form, and to permit or facilitate such removal, the vacuum in the boiler is broken by inlet of air which has been pre-conditioned in such manner that it is dry to a point where contact thereof with the hot malto-dextrine will not raise the moisture content of the latter above approximately two percent. If there were more than approximately 2½ percent of moisture in the malto-dextrine on its removal from the boiler, it could not readily be broken up for the subsequent grinding and pulverizing steps of the process.

After the malto-dextrine has been removed from the boiler, it is broken into chunks of considerable size preliminary to being fed to the grinder. A further feature of the invention is a pre-conditioning or drying of the air in which the malto-dextrine is so broken and fed to the grinder, to the end that no moisture may be formed in the latter, and no heat created therein which might tend to melt or gum the substance.

Other features and objects of the invention will more fully appear upon reference to the accompanying drawing, in which.

Figures 1, 2:
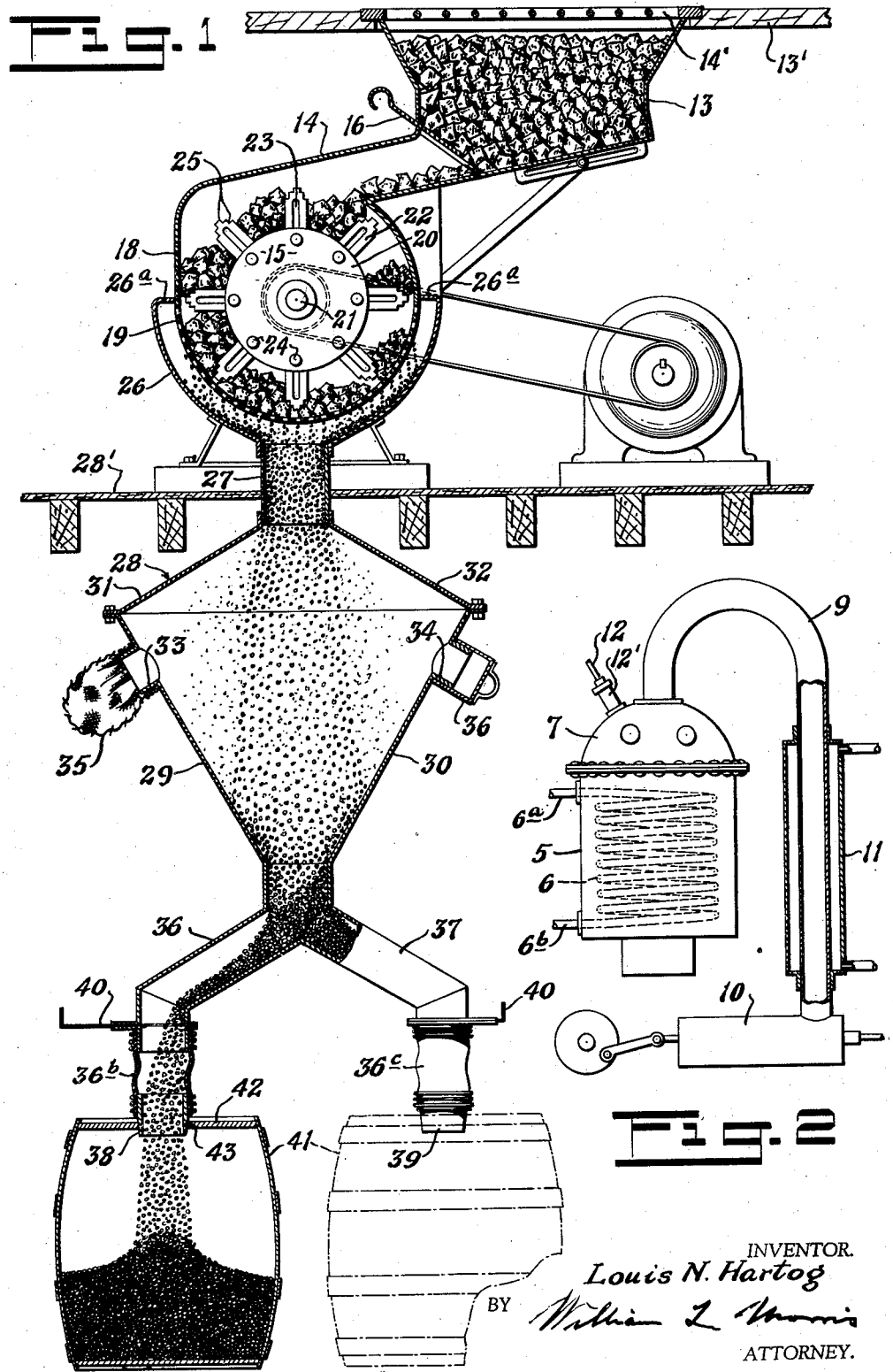
Fig. 1 is a vertical sectional view through a combined grinding and loading apparatus.
Fig. 2 is a view showing a vacuum boiler and means for removing excess moisture and vaporizable by-products from the grain syrup.

Referring to the drawing, there is shown a vacuum boiler 5. Within the same, from top to bottom, is shown an extensive heating coil system 6. This system is provided with suitable inlet and outlet lines, (not shown), but indicated at 6a and 6b; and after the syrup has been introduced into the boiler, it is boiled by steam passing through this system at a high pressure, preferably of the order of 120 pounds, ultimately to raise the temperature of the syrup content to about 215° C. in a vacuum of about 28 inches. The vacuum, starting at zero, is gradually raised to about 15 inches, allowed to remain at this point for about five or seven minutes, and then gradually raised to 28 or 29 inches; the entire boiling operation taking from 20 to 30 minutes, according to the material being worked, and the temperature and vacuum employed. As the water and other vaporizable ingredients are converted to vapor, the latter passes from the boiler by a pipe 9, to a condenser 11, where it is liquefied, and the liquid passes thence to a pump 10 which discharges it to any suitable collecting receptacle.

When the boiling step of the process has been completed, the malto-dextrine, now pure except for an insignificant amount of moisture, remains at the bottom of the boiler in viscous, liquid condition ready to be drawn out and cast into blocks or sheets for breaking and grinding after it has hardened or set. To permit or facilitate such removal from the boiler, the vacuum in the latter is first broken, that is to say, air is admitted to the boiler. If, however, atmospheric air were admitted to the boiler, an undesirable amount of moisture would condense therefrom on contact of the air with the hot malto-dextrine, and this moisture would be absorbed by the malto-dextrine. If the malto-dextrine were thus permitted to attain a moisture content of even 4½ percent, not only would it be impaired as to quality, but it would not be sufficiently brittle for easy breaking and grinding. Hence the air to be admitted to break the vacuum is pre-conditioned, that is to say, it is dryed to a point where it can make no objectionable deposit of water onto the malto-dextrine. In Fig. 2 an air line 12, from any suitable air drying apparatus (not shown) enters the top 7 of the boiler. A valve 12' cuts off this line during the boiling operation, but is opened to permit entry of dry air to break the vacuum when the boiling is completed.

After the malto-dextrine has been drawn from the boiler, it is taken to a chamber, not shown, but the floor of which is indicated at 13' in Fig. 1. This chamber is closed, and is air-conditioned to maintain the air therein as dry as is feasible. In the floor of this chamber is a grating 14' against and through which the blocks or sheets of malto-dextrine are broken into chunks, so as to pass thence into a Klondike or pipe which is connected air-tight with a hopper 13 in a chamber or compartment below the floor 13'. This hopper is connected, air-tight, to a chute 14 for feeding the material to a mill 15. The broken material is prevented from flowing too fast to the mill by means of a plate or other valve, or regulating slide 16 which extends through one side of the hopper, over the upper end of the chute.

The lower end of the chute 14 is unitary or has an air-tight connection with the housing 18 of the mill, and the bottom wall of this housing is a screen 19, through which the ground material may be screened. Interchangeable screens may be used according to the desired size of the granules to be passed therethrough from the mill.

The grinder or mill indicated in the drawings is, of itself, not new with this invention. It has been selected as a suitable element for carrying out one step of the invention. It is the so-called "Humdinger" mill, manufactured by J. B. Sedberry of Utica, New York; and so will not be described in detail. Suffice here to say that the grinding head comprises a system of plates 20 set to and spaced apart on a motor driven shaft 21. Through these plates passes a system of bolts or rods 24. Between adjacent plates hammers 22 are set on the rods 24. The hammers are radially slotted at 23 to permit of their radially in-and-out movement on the rods 24. Under the action of centrifugal force they move radially outward toward the wall of the housing 18. They may, however, yield radially inward upon contact with the chunks of material being ground. The hammers are set in pairs; those of the first pair being set at opposite ends of the shaft, and the aligned hammers of the other pairs being progressively set closer together as they are stepped around the head. The material is thus fed and wedged toward the center of the shaft while at the same time being broken between the ends of the hammers and the wall of the housing. The ends of the hammers are stepped as at 25 to present a plurality of grinding teeth.

As the material is ground, it passes by gravity through the screen, into a hopper 26 which is set, air-tight, to the housing 18 by flanges 26a. Below the screen, the hopper 26 discharges by gravity into a chute 27, which in turn discharges by gravity into an expansion chamber 28, all connections being air-tight. This gravity feed is assured by location of the expansion chamber 28 and loading apparatus on a floor below that on which the grinder is located. The separating floor is indicated at 28'.

This expansion chamber and loading receptacle is formed with downwardly inclined sides 29 and 30, and is provided with upwardly converging walls 31 and 32. The upper part of the receptacle is considerable wider than the lower part thereof, and as the material is discharged in the predetermined granulated condition from the grinder, it will produce a dust in the receptacle which will expand in the upper part of the latter.

Any air remaining in the granulated material will also expand and under pressure produced by the dust can be permitted to escape to the atmosphere by means of vent ports or nipples 33 and 34, located on opposite sides of the receptacle 28. On either or both of these nipples porous fabric dust collecting and breather bags 35 may be mounted. When it is not desired to use such a bag, a metal or other cover 36 may be placed over the nipple.

The bottom of the receptacle 28 discharges, again by gravity, into the loading conduits 36 and 37, which are connected, air-tight, with the reduced lower end of the receptacle. The conduit or filler tubes 36 and 37 are provided with flexible portions 36b and 36c, terminating in tapered parts 38 and 39. A flow control slide or valve 40 is also provided for each filler tube.

The material is loaded into shipping containers 41; and, to exclude air from these containers they may have friction covers 42 forced into the tops thereof. Filler openings 43 are provided in the covers for reception of the tapered end pieces 38 and 39 of the conduits.

By reason of the fact that during and after the breaking of the material, it can contact with no air that has not been pre-conditioned, filtering operations are not necessary. The material settles slowly but regularly in the chamber 30, and there is no tendency for it again to be picked up by air currents. The openings 33 provide for exit of all air entering with the material through hopper 13; and by the bags 35 all flying material that does not settle to the bottom of chamber 30, may be recovered.

From the foregoing, it will be seen that the invention is characterized by the protection of the material from exposure to the atmosphere, at all stages of the process; and by the almost complete elimination of even the preconditioned air in the later steps of the process. Consonant with this guiding purpose, it will be seen that an extensive gravity system, involving three floors of a building, has been substituted for the blower feed ordinarily employed in connection with the so-called "Humdinger" mill, for feeding the material into and through the mill. The nature of the material being handled is such that the air of a blower feed, even if pre-conditioned so as to be dry, would in the grinding operation be so heated as to cause softening and melting of the material.

I claim:

1. A process of manufacturing malto-dextrine from corn or other grain syrups, consisting in boiling the syrup to a temperature of the order of 215° C. in a partial vacuum of the order of 28 inches, while conducting off the vaporizable substances of the syrup until the remaining malto-dextrine is pure except for a water content of the order of 2% or less, causing such malto-dextrine to set and harden under conditions which preclude appreciable accretion of water content, breaking the same into chunks in a dry-air compartment, and from such compartment feeding the same by gravity, and without the admission of air other than such dry air as may incidentally accompany the chunks, into a grinding chamber from which moisture is excluded, there granulating the chunks in the absence of moisture, and by gravity feed, with the exclusion of moisture, delivering the malto-dextrine in granulated form to containers therefor.

2. A process of manufacturing malto-dextrine from corn or other grain syrups, consisting in boiling the syrup to a temperature of the order of 215° C. in a partial vacuum of the order of 28 inches, while conducting off the vaporizable substances of the syrup until the remaining malto-dextrine is pure except for a water content of the order of 2% or less, causing such malto-dextrine to set and harden under conditions which preclude appreciable accretion of water content, breaking the same into chunks in a dry-air compartment, and from such compartment feeding the same without the admission of air other than such dry air as may incidentally accompany the chunks, into a grinding chamber from which moisture is excluded, there granulating the chunks in the absence of moisture, and with the exclusion of moisture delivering the malto-dextrine in granulated form to containers therefor.

3. A process of manufacturing malto-dextrine from corn or other grain syrups, consisting in boiling the syrup in a partial vacuum for a time and at a temperature sufficient to deposit malto-dextrine, substantially pure except for a water content of the order of 2% or less, withdrawing the vaporizable substances of the syrup, breaking the vacuum by admission of dry air to the boiler for removal of the malto-dextrine in the purity in which it was deposited, causing the same to set and harden under conditions which preclude appreciable accretion of water content, and breaking and granulating the same in the absence of moisture.

4. A process of reducing blocks or sheets of malto-dextrine, which is substantially pure except for a water content of the order of 2% or less, to a granulated form of substantially the same purity, consisting of breaking the same into chunks in dry air, feeding the chunks by gravity, and without the admission of air other than such dry air as may incidentally accompany the chunks, into a grinding chamber from which moisture is excluded, there granulating the chunks in the absence of moisture and with the expulsion of dry air which has accompanied the chunks, and by further gravity feed, with the exclusion of moisture, delivering the malto-dextrine in granulated form to containers therefor.

5. A process of reducing blocks or sheets of malto-dextrine, which is substantially pure except for a water content of the order of 2% or less, to a granulated form of substantially the same purity, consisting of breaking the same into chunks in dry air, feeding the chunks by gravity, and without the admission of air other than such dry air as may incidentally accompany the chunks, into a grinding chamber from which moisture is excluded, there granulating the chunks in the absence of moisture, and with the exclusion of moisture delivering the malto-dextrine in granulated form to containers therefor.

6. Apparatus for the manufacture of malto-dextrine from corn and other syrups, comprising means for reducing the syrup to viscous malto-dextrine, dry to a water content of the order of two percent or less, and means for transforming said viscous material into free flowing, powdered or granulated, malto-dextrine of the dryness aforesaid; said means for reducing the syrup to viscous malto-dextrine comprising an air-tight evaporating chamber, an outlet at the upper part thereof for vapors, means in connection with said outlet for gradually reducing the pressure in said chamber during evaporation, from atmospheric pressure to a vacuum of the order of 28 inches, a steam coil system in said chamber of a capacity and area sufficient to take steam of a pressure of the order of 120 pounds and to heat and maintain the syrup content of said chamber at a temperature of the order of 215 degrees C. under the aforesaid vacuum conditions, a normally closed connection from said chamber to a source of dry air, and a valve in said connection for opening the connection to break the vacuum in the chamber, to permit removal of the content thereof.

7. Apparatus for the manufacture of malto-dextrine from corn and other syrups, comprising means for reducing the syrup to viscous malto-dextrine, dry to a water content of the order of two percent or less, and means for transforming said viscous material into free flowing, powdered or granulated, malto-dextrine of the dryness aforesaid; said means for transforming the viscouse material into a powder or granulated state comprising a dry air chamber wherein castings of said viscous material may be broken into chunks, a grinding chamber below and in air-tight connection with said breaking chamber, a grinder in said lower chamber, means for directing a gravity feed to the grinder of chunks of the broken material from the breaking chamber, an expansion chamber below said grinding chamber in air-tight connection with the latter, and means for directing a gravity feed of the material through and from the grinding chamber to the expansion chamber; said grinding and expansion chambers being air-tight against inlet of air thereto, except from the breaking chamber, during the operation of the grinder.

8. Apparatus for the manufacture of malto-dextrine from corn and other syrups consisting of means for reducing the syrup to viscous malto-dextrine, dry to a water content of the order of two percent or less, and means for transforming said viscous material into free flowing, powdered or granulated, malto-dextrine of the dryness aforesaid; said reducing and transforming means comprising an air-tight evaporating chamber, an outlet at the upper part thereof for vapors, means in connection with said outlet for gradually reducing the pressure in said chamber during evaporation from atmospheric pressure to a vacuum of the order of 28 inches, a steam coil system in said chamber of a capacity and area sufficient to take steam of a pressure of the order of 120 pounds and to heat and maintain the syrup content of said chamber at a temperature of the order of 215 degrees C. under the aforesaid vacuum conditions, said chamber having a port through which may be removed in viscous state the malto-dextrine formed by evaporation, a chamber for reception of castings of said viscous material, means for maintaining a dry atmosphere in said receiving chamber, a grinding chamber below and in air-tight connection with said receiving chamber, a grinder in said lower chamber, means for directing a gravity feed to the grinder of malto-dextrine castings from the receiving chamber, an expansion chamber below the grinding chamber, in air-tight connection with the latter, and means for directing a gravity feed of the material through and from the grinding chamber to the expansion chamber; said grinding and expansion chambers being tight against inlet of air thereto, except from the receiving chamber.

LOUIS N. HARTOG.